(12) United States Patent
Lee et al.

(10) Patent No.: US 8,810,500 B2
(45) Date of Patent: Aug. 19, 2014

(54) POWER-APPLYING MODULE, BACKLIGHT ASSEMBLY, AND DISPLAY APPARATUS HAVING THE SAME

(75) Inventors: Dae-Sik Lee, Cheonan-si (KR); Young-A Lee, Cheonan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1242 days.

(21) Appl. No.: 12/205,190

(22) Filed: Sep. 5, 2008

(65) Prior Publication Data

US 2009/0160755 A1 Jun. 25, 2009

(30) Foreign Application Priority Data

Dec. 24, 2007 (KR) .................. 10-2007-0136408

(51) Int. Cl.
*G09G 3/36* (2006.01)
*G05F 1/00* (2006.01)

(52) U.S. Cl.
USPC ........................................ 345/102; 315/291

(58) Field of Classification Search
USPC .......... 345/102, 211–213; 315/219, 224, 247, 315/291
See application file for complete search history.

(56) References Cited

U.S. PATENT DOCUMENTS

| | | | | |
|---|---|---|---|---|
| 7,358,682 | B2 * | 4/2008 | Matsushima | 315/239 |
| 7,473,117 | B2 * | 1/2009 | Miyazono et al. | 439/239 |
| 2006/0279957 | A1 * | 12/2006 | Kwon et al. | 362/378 |
| 2007/0290626 | A1 * | 12/2007 | Matsushima | 315/282 |
| 2008/0084696 | A1 * | 4/2008 | Yang et al. | 362/249 |
| 2010/0213863 | A1 * | 8/2010 | Matsushima | 315/276 |

FOREIGN PATENT DOCUMENTS

| | | |
|---|---|---|
| JP | 2007-134290 | 5/2007 |
| JP | 2007-257881 | 10/2007 |
| KR | 10-2005-0092217 | 9/2005 |
| KR | 10-2006-0027421 | 3/2006 |
| WO | WO 2007069394 A1 * | 6/2007 |

* cited by examiner

*Primary Examiner* — Rodney Amadiz
(74) *Attorney, Agent, or Firm* — F. Chau & Associates, LLC

(57) ABSTRACT

A power-applying module includes a substrate, a voltage transformer, a voltage-applying pattern, a voltage induction pattern, and a protection part. The voltage transformer is disposed on the substrate. The voltage-applying pattern is formed at an end portion of the substrate and is electrically connected to the voltage transformer to apply a driving voltage to a lamp. The voltage induction pattern is formed on the substrate adjacent to the voltage-applying pattern, and is spaced apart from the voltage-applying pattern to sense an induced voltage corresponding to the driving voltage. The induced voltage is induced by the voltage-applying pattern. The protection part detects the induced voltage to control the driving voltage output by the voltage transformer.

20 Claims, 7 Drawing Sheets

POWER-APPLYING MODULE, BACKLIGHT ASSEMBLY, AND DISPLAY APPARATUS HAVING THE SAME

CROSS-REFERENCE TO RELATED APPLICATION

This application claims priority under 35 U.S.C. §119 to Korean Patent Application No. 2007-0136408, filed on Dec. 24, 2007, the disclosure of which is incorporated by reference herein.

BACKGROUND OF THE INVENTION

1. Technical Field

The present disclosure relates to a power-applying module, a backlight assembly having the power-applying module, and a display apparatus having the backlight assembly. More particularly, the present disclosure relates to a power-applying module that may be employed in a liquid crystal display (LCD) panel, a backlight assembly having the power-applying module, and a display apparatus having the backlight assembly.

2. Discussion of the Related Art

A liquid crystal display (LCD) apparatus has lighter weight, lower power consumption, lower driving voltage, etc., compared to other display apparatuses such as a cathode ray tube (CRT), a plasma display panel (PDP), and others. Thus, LCD apparatuses are used in large-screen televisions, as well as monitors, laptop computers, and mobile phones. An LCD apparatus includes an LCD panel displaying an image using optical and electrical properties of liquid crystal, and a backlight assembly disposed under the LCD panel to provide light to the LCD panel.

The backlight assembly generally includes a lamp generating light, a socket electrically connected to an electrode of the lamp, a receiving container for receiving the lamp and the socket, and a power-applying module (inverter) electrically connected to the socket to apply a driving voltage to the lamp.

The inverter includes an inverter substrate, a voltage transformer, an output terminal, a voltage induction capacitor, and a protection circuit. The voltage transformer is disposed on the inverter substrate and increases an externally provided voltage to output a driving voltage. The output terminal is electrically connected to the voltage transformer to output the driving voltage to the socket. The voltage induction capacitor is electrically connected to the output terminal. The protection circuit is electrically connected to the voltage induction capacitor. The voltage induction capacitor generates an induced voltage induced by the output terminal to provide the induced voltage to the protection circuit. The protection circuit stops the voltage transformer from outputting the driving voltage when the driving voltage is abnormal.

The voltage induction capacitor includes a first electrode and a second electrode. The first electrode is formed on a surface of the inverter substrate, and is electrically connected to the output terminal. The second electrode is formed on an opposite surface of the inverter substrate, and is overlapped with the first electrode, and is electrically connected to the protection circuit. Thus, the driving voltage applied to the first electrode through the output terminal may induce an induced voltage at the second electrode through the inverter substrate.

Because the voltage induction capacitor is formed on both surfaces of the inverter substrate, the inverter substrate needs to be a printed circuit board (PCB) having a pattern formed on both surfaces of the PCB. Accordingly, the size of the PCB needs to be increased so that the first and second electrodes may be overlapped with each other by more area. Thus, because the inverter substrate is a PCB having a large size, manufacturing costs for the inverter may be increased.

SUMMARY OF THE INVENTION

Embodiments of the present invention provide a power-applying module having a substrate of reduced size, thereby reducing manufacturing costs.

An exemplary embodiment of the present invention also provides a backlight assembly having the power-applying module.

An exemplary embodiment of the present invention also provides a display apparatus having the backlight assembly.

A power-applying module, according to an exemplary embodiment of the present invention, includes a substrate, a voltage transformer, a voltage-applying pattern, a voltage induction pattern, and a protection part.

The voltage transformer is disposed on the substrate. The voltage-applying pattern is formed at an end of the substrate and is electrically connected to the voltage transformer to apply a driving voltage to a lamp. The voltage induction pattern is formed on the substrate in a position adjacent to the voltage-applying pattern, and is spaced apart from the voltage-applying pattern so as to sense an induced voltage corresponding to the driving voltage. The induced voltage is induced by the voltage-applying pattern. The protection part detects the induced voltage to control the driving voltage output by the voltage transformer.

The voltage transformer, the voltage-applying pattern, and the voltage induction pattern may be formed on the same surface of the substrate.

The protection part may stop the voltage transformer from outputting the driving voltage when the driving voltage is greater than a reference voltage having a predetermined voltage level. Furthermore, the protection part may include an operational amplifier comparing the induced voltage with the reference voltage to control the driving voltage outputted by the voltage transformer.

The substrate may include a division recess formed between the voltage-applying pattern and the voltage induction pattern to separate the voltage-applying pattern from the voltage induction pattern. Furthermore, the substrate may include guide recesses, and the voltage-applying pattern and the voltage induction pattern may be disposed between the guide recesses.

The power-applying module may further include an induced voltage distribution part electrically connected to the voltage induction pattern and the protection part to reduce the induced voltage detected by the protection part.

The power-applying module may further include a direct current (DC)/alternative current (AC) transformer to transform an external DC voltage to an internal output AC voltage and to provide the internal output AC voltage to the voltage transformer. The power-applying module may further include a power controller providing a power control signal to the DC/AC transformer to control the internal output AC voltage.

The protection part may provide a protection signal to the power controller to control the driving voltage output by the voltage transformer.

A length of the voltage induction pattern may be substantially the same as a length of the voltage-applying pattern, and a width of the voltage induction pattern may be less than a width of the voltage-applying pattern.

In an exemplary embodiment of the present invention, a backlight assembly includes a plurality of light source units, at least one driving voltage-applying socket, and a power-applying module.

The driving voltage-applying socket is electrically connected to at least one of electrodes of the light source units to apply a driving voltage. The power-applying module applies the driving voltage to the driving voltage-applying socket.

The power-applying module includes a substrate, a voltage transformer, a voltage-applying pattern, a voltage induction pattern, and a protection part.

The voltage transformer is disposed on the substrate. The voltage-applying pattern is formed at an end of the substrate and electrically connected to the voltage transformer to apply a driving voltage to the light source units. The voltage induction pattern is formed on the substrate in a position adjacent to the voltage-applying pattern, and is spaced apart from the voltage-applying pattern so as to sense an induced voltage corresponding to the driving voltage. The induced voltage is induced by the voltage-applying pattern. The protection part detects the induced voltage to control the driving voltage output by the voltage transformer.

The voltage transformer, the voltage-applying pattern and, the voltage induction pattern may be formed on the same surface of the substrate.

The protection part may stop the voltage transformer from outputting the driving voltage when the driving voltage is greater than a reference voltage having a predetermined voltage level.

The backlight assembly may further include a receiving container including a bottom plate and sidewalls formed on edges of the bottom plate to receive the light source units and the driving voltage-applying socket.

A portion of the driving voltage-applying socket may protrude below the bottom plate through a socket hole formed through the bottom plate, and the portion of the driving voltage-applying socket has an insertion recess for combining with the substrate by a sliding method.

The backlight assembly may further include at least one ground voltage-applying socket disposed in the receiving container and electrically connected to at least one electrode different from the electrode electrically connected to the driving voltage-applying socket so as to apply a ground voltage. The ground voltage-applying socket may be electrically connected to the receiving container to receive the ground voltage.

The backlight assembly may further include a metal connection plate electrically connecting the ground voltage-applying socket to the receiving container.

In an exemplary embodiment of the present invention, a display apparatus includes a display panel displaying an image and a backlight assembly providing a light to the display panel.

The backlight assembly includes a plurality of light source units, at least one driving voltage-applying socket, and a power-applying module. The driving voltage-applying socket is electrically connected to at least one of electrodes of the light source units to apply a driving voltage. The power-applying module applies the driving voltage to the driving voltage-applying socket.

The power-applying module includes a substrate, a voltage transformer, a voltage-applying pattern, a voltage induction pattern and a protection part. The voltage transformer is disposed on the substrate. The voltage-applying pattern is formed at an end of the substrate and electrically connected to the voltage transformer to apply a driving voltage to the light source units. The voltage induction pattern is formed on the substrate in a position adjacent to the voltage-applying pattern, and is spaced apart from the voltage-applying pattern so as to sense an induced voltage corresponding to the driving voltage. The induced voltage is induced by the voltage-applying pattern. The protection part detects the induced voltage to control the driving voltage output by the voltage transformer.

As described above, a voltage induction pattern and a voltage-applying pattern are formed on the same surface of a substrate so that the voltage induction pattern is disposed adjacent to the voltage-applying pattern so as to sense an induced voltage induced by the voltage-applying pattern. Thus, the substrate may have a smaller size, and manufacturing costs for the substrate may be reduced.

BRIEF DESCRIPTION OF THE DRAWINGS

Exemplary embodiments of the present invention will become apparent by reference to the following detailed description when considered in conjunction with the accompanying drawings, wherein.

DETAILED DESCRIPTION OF EXEMPLARY EMBODIMENTS

Figure 1:
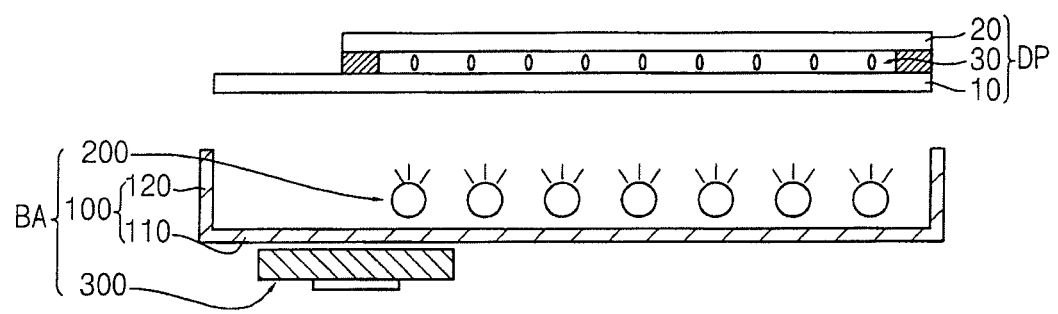
FIG. 1 is a cross-sectional view illustrating a display apparatus according to an exemplary embodiment of the present invention.

Exemplary embodiments of the present invention will be described more fully hereinafter with reference to the accompanying drawings. In the drawings, the size and relative sizes of layers and regions may be exaggerated for clarity. Like numbers refer to like elements across various figures.

FIG. 1 is a cross-sectional view illustrating a display apparatus according to an exemplary embodiment of the present invention.

Referring to FIG. 1, a display apparatus includes a display panel DP and a backlight assembly BA providing light to the display panel DP.

The display panel may include a liquid crystal display (LCD) panel. The display panel DP may include a first substrate 10, a second substrate 20 facing the first substrate 10, and a liquid crystal layer 30 interposed between the first and second substrates 10 and 20.

The first substrate 10 may include a plurality of gate lines formed in a first direction, a plurality of data lines formed in a second direction substantially perpendicular to the first direction, a plurality of thin-film transistors (TFT) electrically connected to the gate lines and the data lines, and a plurality of pixel electrodes electrically connected to the TFTs. The pixel electrode may include a transparent conductive material.

The second substrate 20 faces the first substrate 10. The second substrate 20 may include a plurality of color filters corresponding to the pixel electrodes and a common electrode formed on substantially the entire surface of the second substrate 20. The common electrode includes a transparent conductive material. The color filters may include a plurality of red color filters, a plurality of green color filters, and a plurality of blue color filters.

The liquid crystal layer 30 is interposed between the first and second substrates 10 and 20. The arrangement of the liquid crystal layer 30 may be changed by an electric field generated between the pixel electrodes and the common electrode. With the arrangement of the liquid crystal layer 30, the light transmittance of the liquid crystal layer 30 is changed, thereby displaying an image on a screen.

The backlight assembly BA is disposed under the display panel DP to provide light to the display panel DP.

The display apparatus may further include an optical member (not shown) disposed between the display panel DP and the backlight assembly BA to improve characteristics of the light provided by the backlight assembly BA.

The optical member may include a diffusion sheet to diffuse the light provided by the backlight assembly BA and a prism sheet disposed on the diffusion sheet to increase the brightness of the light passing through the diffusion sheet with respect to a front direction.

Figure 2:
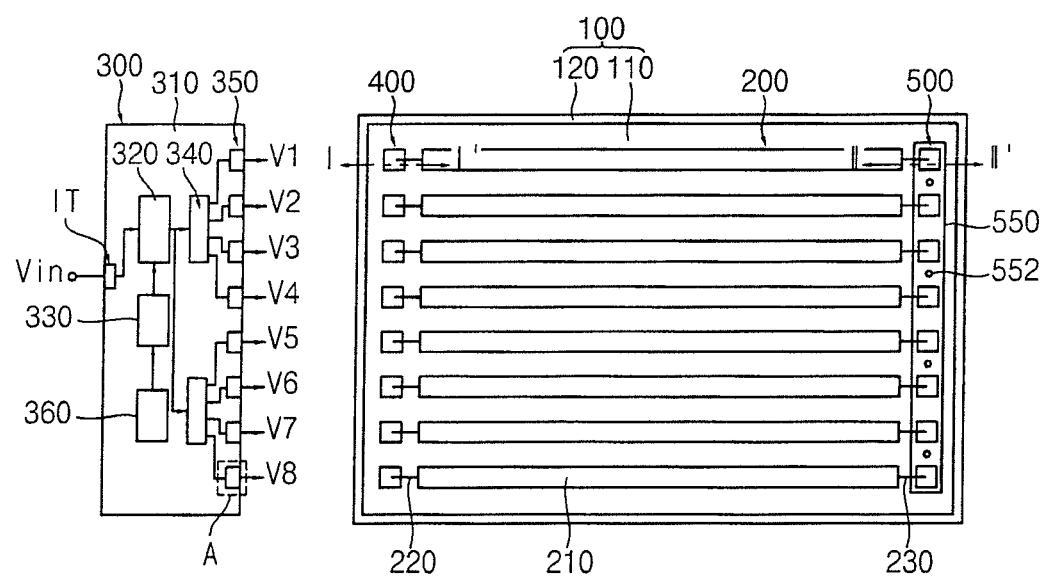
FIG. 2 is a plan view illustrating a backlight assembly of the display apparatus of FIG. 1.

FIG. 2 is a plan view illustrating a backlight assembly of the display apparatus of FIG. 1.

Referring to FIGS. 1 and 2, the backlight assembly BA may include a receiving container 100, a plurality of lamps 200, a power-applying module 300, a plurality of driving voltage-applying sockets 400, and a plurality of ground voltage-applying sockets 500. The power-applying module 300 will hereinafter be referred to as an inverter.

The receiving container 100 includes a bottom plate 110 and sidewalls 120 formed on edges of the bottom plate 110. The receiving container 100 receives the lamps 200, the driving voltage-applying sockets 400, and the ground voltage-applying sockets 500. The receiving container 100 may include a metallic material that is conductive.

The lamps 200 are received in the receiving container 100, and generate light. The lamps 200 may have a linear shape, and may be arranged parallel to each other along a predetermined direction. For example, eight lamps 200 may be arranged parallel to each other along a predetermined direction.

Each of the lamps 200 may include a lamp body 210 having a discharging gas therein to generate light, a first electrode 220 formed at a side of the lamp body 210, and a second electrode 230 formed at an opposite side of the lamp body 210. When a voltage is applied to the first and second electrodes 220 and 230, the lamp 200 may generate light by using the discharging gas.

Examples of the lamps 200 may include a cold cathode fluorescent lamp (CCFL) or a hot cathode fluorescent lamp (HCFL), etc. Furthermore, examples of the lamp 200 may include an internal electrode fluorescent lamp (IEFL), wherein a portion of the first and second electrodes 220 and 230 is disposed in the lamp body 210, and an external electrode fluorescent lamp (EEFL), wherein a portion of the first and second electrodes 220 and 230 is disposed outside the lamp body 210. The lamps 200 may have a U-shape instead of a linear shape.

The inverter 300 may be externally provided with an external direct current (DC) voltage Vin, and may transform the external DC voltage Vin to generate a plurality of driving voltages. The inverter 300 may provide the driving voltages to the first electrodes 220 of the lamps 200 through driving pattern parts 350.

The inverter 300 may generate a first driving voltage V1, a second driving voltage V2, a third driving voltage V3, a fourth driving voltage V4, a fifth driving voltage V5, a sixth driving voltage V6, a seventh driving voltage V7, and an eighth driving voltage V8, and may provide the first through eight driving voltages V1, V2, V3, V4, V5, V6, V7, and V8 to the first electrodes 220 of eight lamps 200 through eight driving pattern parts 350.

The inverter 300 may be disposed on a rear surface of the bottom plate 110 corresponding to the first electrodes 220 of the lamps 200. Alternatively, the inverter 300 may be disposed on an outer side surface of a sidewall 120 corresponding to the electrodes of the lamps 200.

The driving voltage-applying sockets 400 are disposed in the receiving container 100, and are electrically connected to the first electrodes 220. Furthermore, the driving voltage-applying sockets 400 are electrically coupled to the driving pattern parts 350 of the inverter 300. Thus, the driving voltage-applying sockets 400 may apply the driving voltages provided by the inverter 300 to the first electrodes 220 of the lamps 200.

Eight driving voltage-applying sockets 400 may be electrically coupled to eight driving pattern parts 350, and may be electrically connected to first electrodes 220 of eight lamps 200. Thus, the driving voltage-applying sockets 400 may provide the first through eight driving voltages V1, V2, V3, V4, V5, V6, V7, and V8 to the first electrodes 220 of the eight lamps 200.

The ground voltage-applying sockets 500 are disposed in the receiving container 100, and are electrically connected to the bottom plate 110. Furthermore, the ground voltage-applying sockets 500 are electrically connected to the second electrodes 230 of the lamps 200. Thus, the ground voltage-applying sockets 500 may provide a ground voltage to the second electrodes 230 of the lamps 200 from the receiving container 100.

Eight ground voltage-applying sockets 500 may be electrically connected to the bottom plate 110 of the receiving container 100, and may be electrically connected to second electrodes 230 of eight lamps 200. Thus, the ground voltage-applying sockets 500 may provide the ground voltage to the second electrodes 230 of the eight lamps 200.

Referring to FIG. 2, the driving voltages are applied to the first electrodes 220 of the lamps 200 through the driving voltage-applying sockets 400. The ground voltage is applied to the second electrodes 230 of the lamps 200 through the ground voltage-applying sockets 500.

Alternatively, a first phase driving voltage may be applied to the first electrodes 220 of the lamps 200, and a second phase driving voltage having a phase opposite to the first phase driving voltage may be applied to the second electrodes 230 of the lamps 200.

The backlight assembly BA may include first phase driving voltage-applying sockets coupled to the first electrodes 220 of the lamps 200 to provide the first phase driving voltage, and second phase driving voltage-applying sockets coupled to the second electrodes 230 of the lamps 200 to provide the second phase driving voltage.

The backlight assembly BA may include a first phase inverter electrically connected to the first phase driving voltage-applying sockets to provide the first phase driving voltage, and a second phase inverter electrically connected to the second phase driving voltage-applying sockets to provide the second phase driving voltage.

Figure 3:
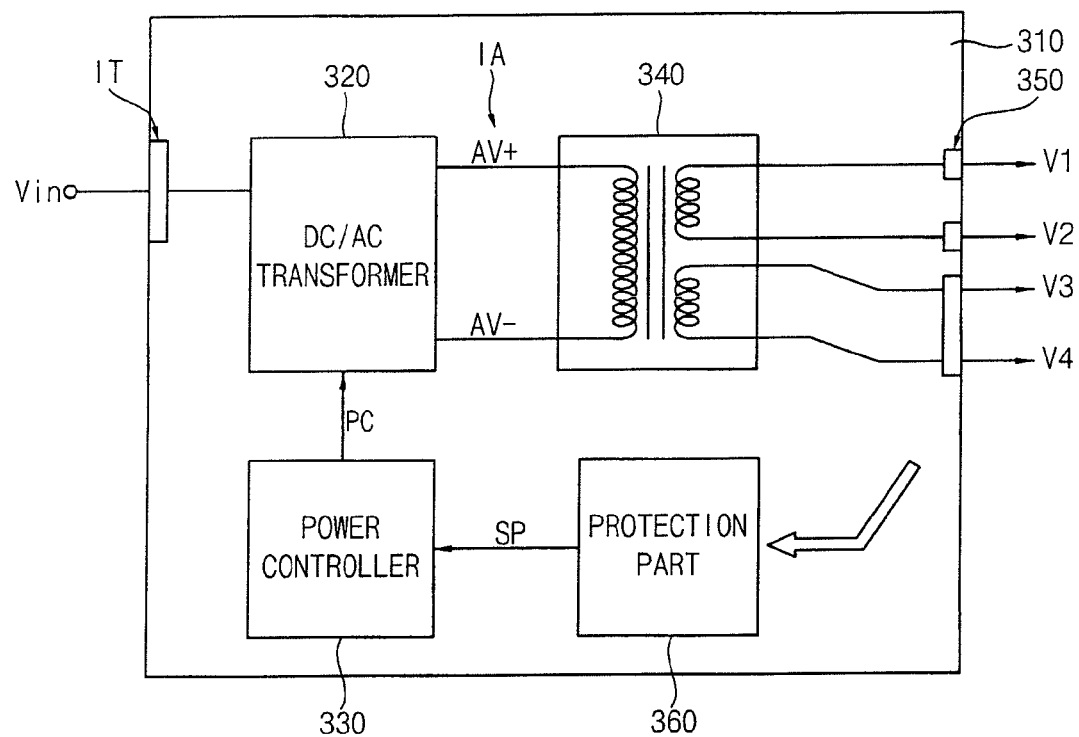
FIG. 3 is a block diagram illustrating an inverter of the backlight assembly of FIG. 2.

FIG. 3 is a block diagram illustrating an inverter of the backlight assembly of FIG. 2.

Referring to FIGS. 2 and 3, an inverter 300 may include a substrate 310, a DC/AC transformer 320, a power controller 330, a voltage transformer 340, and a protection part 360. Hereinafter, the substrate 310 will be referred to as an inverter substrate.

The inverter substrate 310 may include a printed circuit board (PCB) having a pattern on both surfaces of the PCB.

The DC/AC transformer 320 may be disposed on the inverter substrate 310. The DC/AC transformer 320 may receive an external DC voltage Vin through an input terminal IT formed on the inverter substrate 310. In an exemplary embodiment, a voltage level of the external DC voltage Vin may be about 24 V. The DC/AC transformer 320 may transform the external DC voltage Vin into an internal output AC voltage IA to provide the internal output AC voltage IA to the voltage transformer 340.

The power controller 330 may be disposed on the inverter substrate 310, and may provide a power control signal PC to the DC/AC transformer 320. Thus, the power controller 330 may control the internal output AC voltage IA in the DC/AC transformer 320. The power controller 330 may control power output, a level, a frequency, of the internal output AC voltage IA.

The voltage transformer 340 receives the internal output AC voltage IA from the DC/AC transformer 320, increases the voltage of the internal output AC voltage IA, and generates driving voltages for driving the lamps 200.

The voltage transformer 340 may be a multiple-output voltage transformer capable of increasing the internal output AC voltage IA to simultaneously output a plurality of driving voltages. The voltage transformer 340 may be a quadruple-output voltage transformer capable of simultaneously generating a first driving voltage V1, a second driving voltage V2, a third driving voltage V3, and a fourth driving voltage V4. The voltage transformer 340 may include an input coil, a first output coil, and a second output coil.

A first AC voltage AV+ and a second AC voltage AV− are respectively applied to both ends of the input coil. The second AC voltage AV− has a phase opposite to the first AC voltage AV+. Both ends of first output coil and both ends of the second output coil are electrically connected to four of the driving pattern parts 350.

Thus, the internal output AC voltage IA applied to the input coil is raised in the quadruple-output voltage transformer 340 to generate the first through four of the driving voltages V1, V2, V3, and V4 at both ends of the first output coil and both ends of the second output coil. Each of the first through four of the driving voltages V1, V2, V3, and V4 may be an AC voltage having a range of about 1 kV to about 10 kV.

Since the inverter 300 of an exemplary embodiment of the present invention generates the first through eight driving voltages V1, V2, V3, V4, V5, V6, V7, and V8, the inverter 300 may include two of the quadruple-output voltage transformers 340. Referring to FIG. 3, one of the quadruple-output voltage transformer 340 is illustrated by way of example. Alternatively, the inverter 300 may include an octuple-output voltage transformers 340 instead of two of the quadruple-output voltage transformers 340.

The protection part 360 may detect the driving voltages applied to the lamps 200 through the driving pattern parts 350 of the inverter 300, so as to control output of the driving voltages when the driving voltages are abnormal.

The protection part 360 may sense a first induced voltage, a second induced voltage, a third induced voltage, a fourth induced voltage, a fifth induced voltage, a sixth induced voltage, a seventh induced voltage, and an eighth induced voltage, which respectively correspond to the first through eight driving voltages V1, V2, V3, V4, V5, V6, V7 and V8.

The protection part 360 may compare the first through eighth induced voltages with a reference voltage to provide a protection signal SP to the power controller 330. The power controller 330 controls the DC/AC transformer 320 in response to the protection signal SP, thereby controlling output of the driving voltages.

When a portion of the lamps 200 is damaged, or when a portion of the driving pattern parts 350 is disconnected, a voltage level of the driving voltage may be excessively increased. The protection part 360 may temporarily or permanently stop the voltage transformer 340 from outputting the driving voltages when the driving voltages are greater than a reference voltage appropriate for operating the lamps 200.

Figure 4:
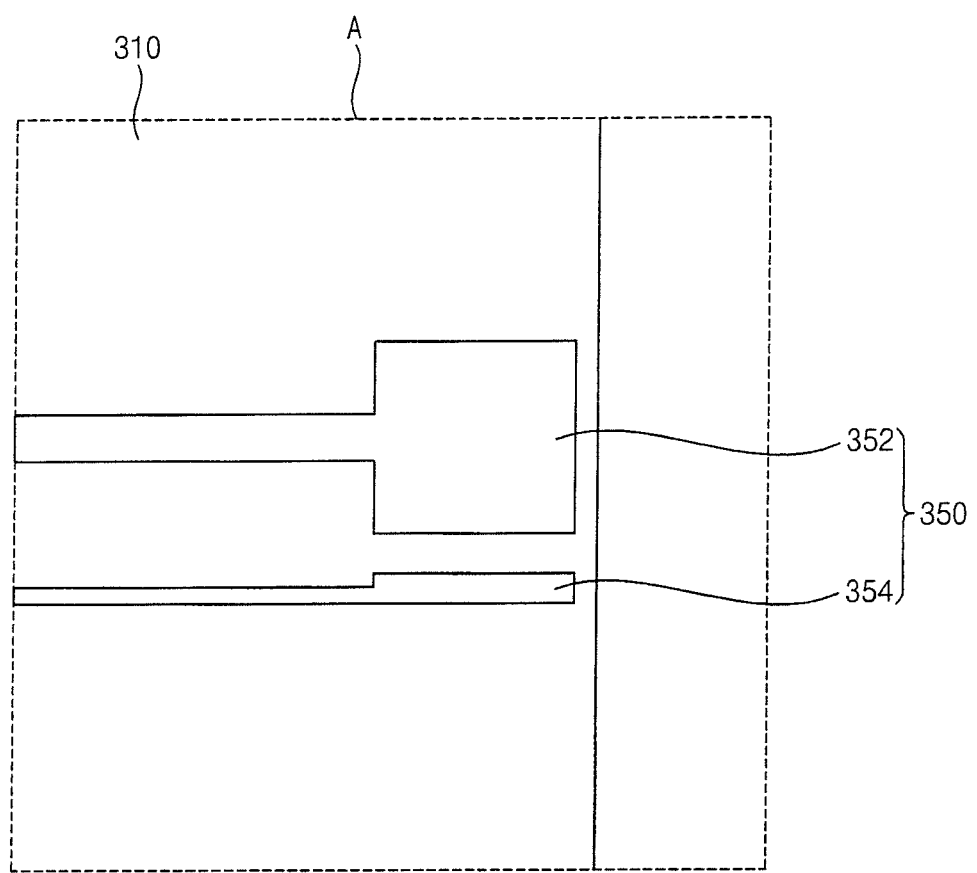
FIG. 4 is an enlarged plan view illustrating a region A of FIG. 2.

FIG. 4 is an enlarged plan view illustrating a region A of FIG. 2.

Referring to FIGS. 2 and 4, each of the driving pattern parts 350 includes a voltage-applying pattern 352 and a voltage induction pattern 354.

The voltage-applying pattern 352 is formed at an end of a surface of the inverter substrate 310. The voltage-applying pattern 352 is electrically connected to the voltage transformer 340, and the driving voltage is applied to the voltage-applying pattern 352 through the voltage transformer 340. The voltage-applying pattern 352 may be electrically connected to the driving voltage-applying socket 400 and may provide the driving voltage to the driving voltage-applying socket 400.

The voltage induction pattern 354 is formed on a surface of the inverter substrate 310 so that the voltage induction pattern 354 is spaced apart from the voltage-applying pattern 352. The voltage induction pattern 354 is disposed adjacent to the voltage-applying pattern 352, and is electrically affected by the driving voltage applied to voltage-applying pattern 352.

The driving voltage applied to voltage-applying pattern 352 may induce an induced voltage at the voltage induction pattern 354. Accordingly, the voltage induction pattern 354 may sense a voltage level of the induced voltage, which corresponds to the driving voltage.

The voltage-applying pattern 352 and the voltage induction pattern 354 may have a substantially rectangular shape when viewed from a plan view. The voltage-applying pattern 352 and the voltage induction pattern 354 may have substantially the same length, and a width of the voltage induction pattern 354 may be less than a width of the voltage-applying pattern 352.

The inverter substrate 310 may be extended in a first direction so that the inverter substrate 310 may be combined with the driving voltage-applying sockets 400 arranged in the direction. By way of example, a length of the inverter substrate 310 may be substantially equal to or less than a length of the sidewall 120 facing the inverter 300.

Figure 5:
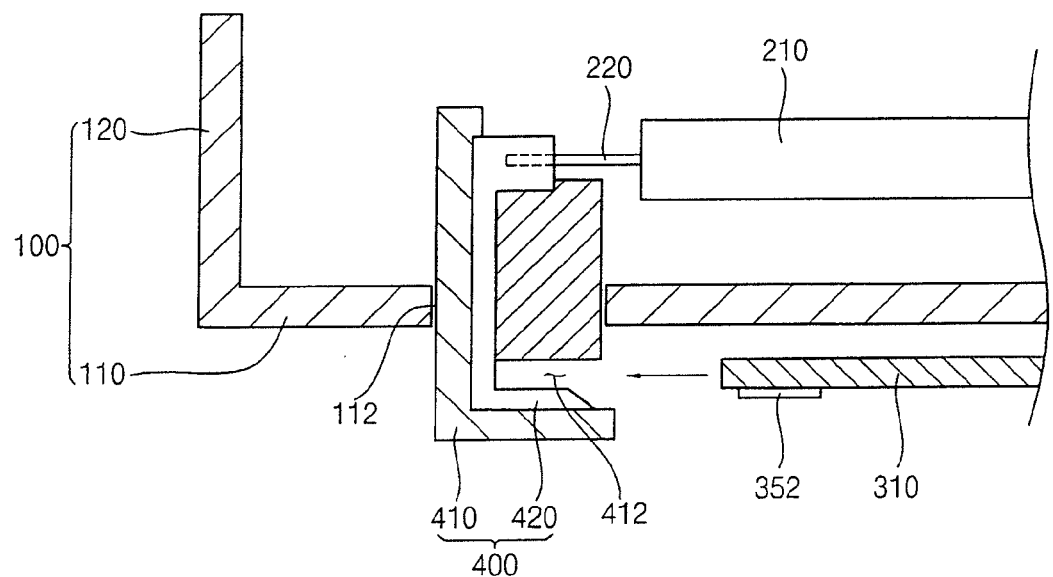
FIG. 5 is a cross-sectional view taken along a line I-I' of FIG. 2.

FIG. 5 is a cross-sectional view taken along a line I-I' of FIG. 2.

Referring to FIGS. 2 and 5, the driving voltage-applying sockets 400 are received in the receiving container 100, and a portion of each of the driving voltage-applying sockets 400 may protrude below the bottom plate 110 through a socket hole 112 formed through the bottom plate 110.

Each of the driving voltage-applying sockets 400 may include a driving socket body 410 and a driving voltage-applying part 420.

The driving socket body 410 is disposed in the receiving container 100 to correspond to the first electrode 220 of one of the lamps 200, and a portion of the driving socket body protrudes below the bottom plate 110 through the socket hole 112. The driving socket body 410 includes an insertion recess 412 formed at the portion protruding below the bottom plate 110 so that the insertion recess 412 is combined with a portion of the inverter substrate 310 by a sliding method.

The driving voltage-applying part 420 is disposed in the driving socket body 410, and is electrically connected to one of the voltage-applying patterns 352 and the first electrode 220 of one of the lamps 200. Thus, the first electrode 220 of one of the lamps 200 may be coupled to and electrically connected to an upper end of the driving voltage-applying part 420. One of the voltage-applying patterns 352 may be electrically connected to a lower end of the driving voltage-applying part 420 when the inverter substrate 310 is inserted into the insertion recess 412 to be combined with the driving socket body 410.

Figure 6:
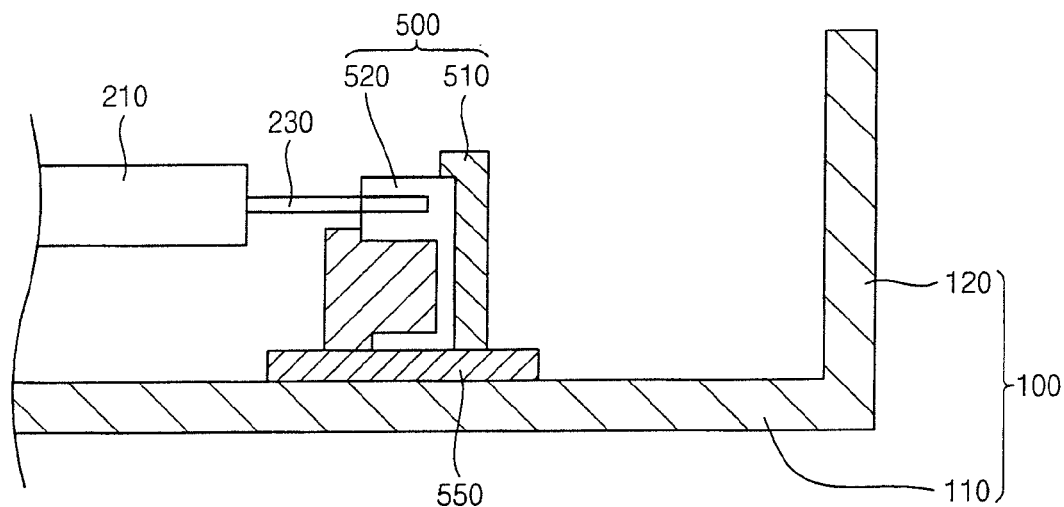
FIG. 6 is a cross-sectional view taken along a line II-II' of FIG. 2.

FIG. 6 is a cross-sectional view taken along a line II-II' of FIG. 2.

Referring to FIGS. 2 and 6, each of the ground voltage-applying sockets 500 may include a ground socket body 510 and a ground voltage-applying part 520.

The ground socket body 510 is disposed in the receiving container 100 to correspond to the second electrode 230 of one of the lamps 200.

The ground voltage-applying part 520 is disposed in the ground socket body 510, and is electrically connected to the bottom plate 110 of the receiving container 100. An upper end of the ground voltage-applying part 520 may be coupled to and electrically connected to the second electrode 230 of one of the lamps 200.

A metal connection plate 550 may be disposed between the ground socket body 510 and the bottom plate 110 of the receiving container 100.

The metal connection plate 550 may be electrically connected to the bottom plate 110 and a lower portion of the ground voltage-applying part 520. The metal connection plate 550 may be secured with the bottom plate 110 by a screw so as to be electrically connected to the bottom plate 110. Thus, the metal connection plate 550 may transfer the ground voltage from the receiving container 100 to the ground voltage-applying part 520.

The metal connection plate 550 may be extended in the direction so as to overlap with the ground voltage-applying sockets 500. For example, the metal connection plate 550 may be extended to overlap with eight of the ground voltage-applying sockets 500 so that the metal connection plate 550 may be electrically connected to eight of the ground voltage-applying sockets 500.

Figure 7:
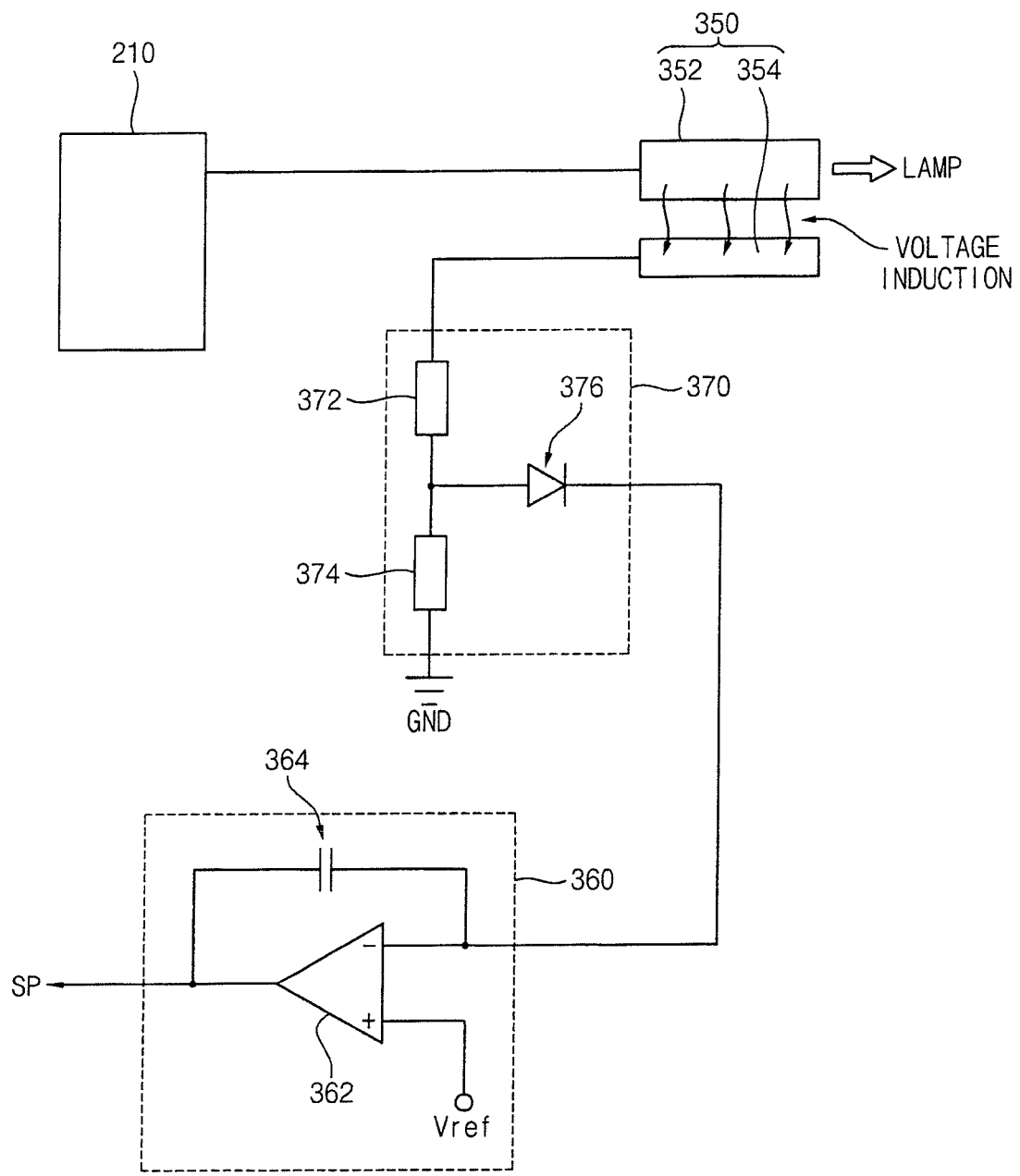
FIG. 7 is a circuit diagram illustrating electrical connections among a driving pattern part, an induced voltage distribution part, and a protection part, of an inverter illustrated in FIG. 3.

FIG. 7 is a circuit diagram illustrating electrical connections among a driving pattern part, an induced voltage distribution part, and a protection part, of an inverter illustrated in FIG. 3.

Referring to FIGS. 3, 4, and 7, the inverter 300 may further include an induced voltage distribution part 370 that is electrically connected to the voltage induction pattern 354 and the protection part 360, so as to reduce a voltage level of the induced voltage applied to the protection part 360.

The induced voltage distribution part 370 may include a first distribution element 372 and a second distribution element 374.

A first end of the first distribution element 372 is electrically connected to the voltage induction pattern 354, and a second end of the first distribution element 372 is electrically connected to a first end of the second distribution element 374, and a second end of the second distribution element 374 is electrically connected to a ground GND. The first and second distribution elements 372 and 374 may include a resistor or a capacitor.

A divided induced voltage having a voltage level less than the induced voltage may be generated between the first and second distribution elements 372 and 374. The divided induced voltage having a desired voltage level may be generated by controlling a proportion of the first second distribution elements 372 and 374. In an exemplary embodiment of the present invention, the divided induced voltage may have a range of about 1 V through about 10 V.

The induced voltage distribution part 370 may further include a diode 376 electrically connected to the protection part 360, and a node between the first and second distribution elements 372 and 374 so as to allow the divided induced voltage to be applied to only the protection part 360. Thus, after the divided induced voltage passes through the diode 376, the divided induced voltage may substantially become a DC voltage.

The protection part 360 may include at least one operational amplifier 362 and at least one operational capacitor 364.

A first input of the operational amplifier 362 is electrically connected to the diode 376, and receives the divided induced voltage. A second input of the operational amplifier 362 receives a reference voltage, for example, a DC voltage of about 5 V. An output of the operational amplifier 362 may be electrically connected to the power controller 330. Furthermore, the operational capacitor 364 may electrically connect the output of the operational amplifier 362 to the first input of the operational amplifier 362.

The operational amplifier 362 may compare the divided induced voltage applied to the first input with the reference voltage Vref applied to the second input so as to provide the protection signal SP to the power controller 330. When the divided induced voltage is greater than the reference voltage Vref, the operational amplifier 362 may provide the protection signal SP to the power controller 330 so as to stop output of the driving voltage.

Figure 8:
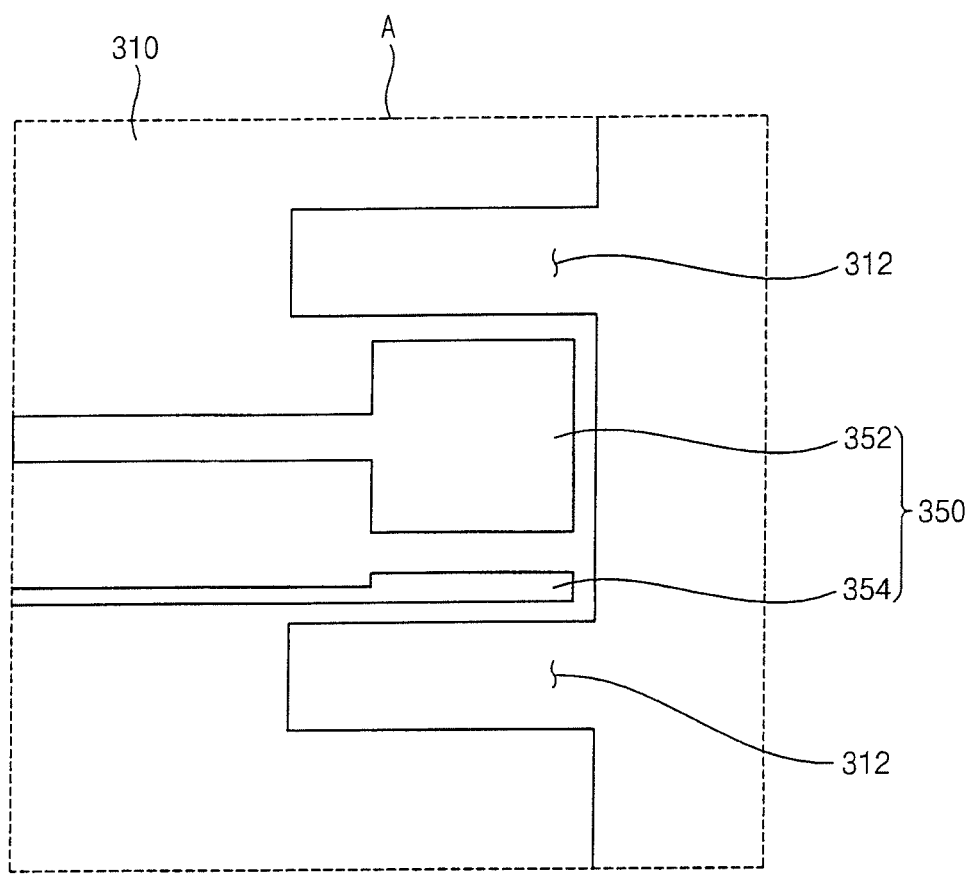
FIG. 8 is a plan view illustrating a portion of an inverter of a display apparatus according to an exemplary embodiment of the present invention.

FIG. 8 is a plan view illustrating a portion of an inverter of a display apparatus according to an exemplary embodiment of the present invention.

Referring to FIGS. 4 and 8, an inverter substrate 310 includes at least two guide recesses 312 unlike the inverter substrate illustrated in FIG. 4.

The guide recesses 312 may be formed adjacent to a driving pattern part 350. One of the guide recesses 312 may be formed beyond a voltage-applying pattern 352, and a remaining one of the guide recesses 312 may be formed below a ground voltage-applying electrode 354.

A recessed depth of the guide recess 312 may correspond to a length of a driving pattern part 350. The recessed depth of the guide recess 312 may be substantially equal to or longer than the length of the driving pattern part 350.

Since two guide recesses 312 may be formed adjacent to a driving pattern part 350, the voltage-applying pattern 352 and a driving voltage-applying socket 400 may be guided to be combined with each other when the inverter substrate 310 is combined with the driving voltage-applying socket 400 by a sliding method.

Figure 9:
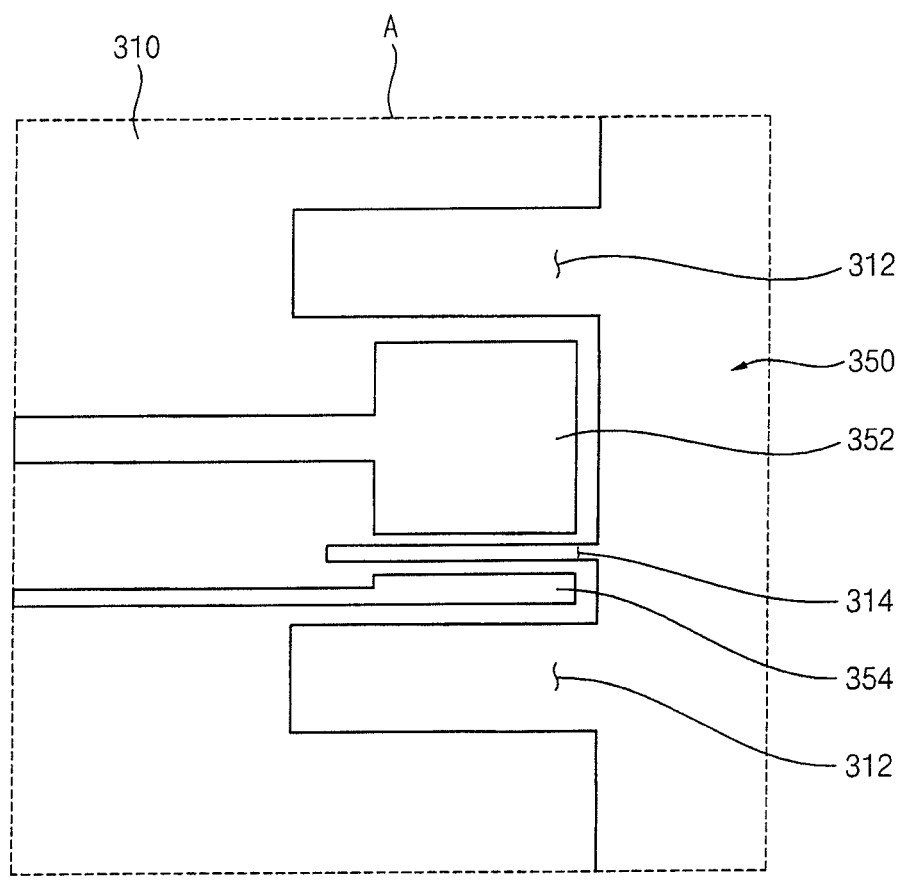
FIG. 9 is a plan view illustrating a portion of an inverter of a display apparatus according to an exemplary embodiment of the present invention.

FIG. 9 is a plan view illustrating a portion of an inverter of a display apparatus according to an exemplary embodiment of the present invention.

Referring to FIGS. 8 and 9, an inverter substrate 310 further includes a division recess 314 unlike the inverter substrate illustrated in FIG. 8.

The division recess 314 is formed between a voltage-applying pattern 352 and a voltage induction pattern 354 to electrically separate the voltage-applying pattern 352 from the voltage induction pattern 354.

A recessed depth of the division recess 314 may correspond to a length of a driving pattern part 350. The recessed depth of the division recess 314 may be substantially equal to or longer than the length of the driving pattern part 350.

As described above, a voltage induction pattern and a voltage-applying pattern are formed on the same surface of an inverter substrate, and the voltage induction pattern is formed adjacent to the voltage-applying pattern so as to sense an induced voltage induced by the voltage-applying pattern. Thus, the inverter substrate may employ a PCB having a pattern formed on a single surface instead of a PCB having patterns formed on both surfaces, and the inverter substrate may have a smaller size compared to a conventional inverter substrate. Accordingly, manufacturing costs for the inverter substrate may be reduced.

Although exemplary embodiments of the present invention have been described for illustrative purposes, it is understood that the present invention should not be limited to these exemplary embodiments but various changes and modifications can be made, without departing from the spirit and scope of the disclosure.

What is claimed is:

1. A power-applying module comprising:
 a substrate;
 a voltage transformer disposed on the substrate;
 a voltage-applying pattern formed at an end portion of the substrate and electrically connected to the voltage transformer to apply a driving voltage to a lamp;
 a voltage induction pattern formed on the substrate adjacent to the voltage-applying pattern and spaced apart from the voltage-applying pattern to sense an induced voltage corresponding to the driving voltage, the induced voltage being induced by the voltage-applying pattern; and
 a protection part detecting the induced voltage to control the driving voltage output by the voltage transformer,
 wherein the voltage-applying pattern and the voltage induction pattern are formed on the same surface of the substrate without being formed on an opposite surface of the substrate,
 wherein the voltage induction pattern is rectangular and having a rectangular width greater than a linear pattern of a signal line connected to the voltage induction pattern,
 wherein the voltage transformer is a multiple-output transformer configured to simultaneously output respective driving voltages to a plurality of lamps, and
 wherein the rectangular voltage induction pattern senses the induced voltage resulting solely from the voltage applying pattern on the same surface of the substrate.

2. The power-applying module of claim 1, wherein the voltage transformer is formed on the same surface of the substrate as the voltage-applying pattern and the voltage induction pattern.

3. The power-applying module of claim 1, wherein the protection part stops the voltage transformer from outputting the driving voltage when the driving voltage is greater than a reference voltage having a predetermined voltage level.

4. The power-applying module of claim 1, wherein the protection part comprises an operational amplifier comparing the induced voltage with the reference voltage to control the driving voltage outputted by the voltage transformer.

5. The power-applying module of claim 1, wherein the substrate comprises a division recess formed between the voltage-applying pattern and the voltage induction pattern to separate the voltage-applying pattern from the voltage induction pattern.

6. The power-applying module of claim 1, wherein the substrate comprises guide recesses, and the voltage-applying pattern and the voltage induction pattern are disposed between the guide recesses.

7. The power-applying module of claim 1, further comprising an induced voltage distribution part electrically connected to the voltage induction pattern and the protection part to reduce the induced voltage detected by the protection part.

8. The power-applying module of claim 1, further comprising a direct current (DC)/alternating current (AC) transformer to transform an external DC voltage to an internal output AC voltage and to provide the internal output AC voltage to the voltage transformer.

9. The power-applying module of claim 8, further comprising a power controller providing a power control signal to the DC/AC transformer to control the internal output AC voltage.

10. The power-applying module of claim 9, wherein the protection part provides a protection signal to the power controller to control the driving voltage output by the voltage transformer.

11. The power-applying module of claim 1, wherein a length of the voltage induction pattern is substantially the same as a length of the voltage-applying pattern, and a width of the voltage induction pattern is less than a width of the voltage-applying pattern.

12. A backlight assembly comprising:
 a plurality of light source units;
 at least one driving voltage-applying socket electrically connected to at least one of a plurality of electrodes of the light source units to apply a driving voltage; and
 a power-applying module applying the driving voltage to the driving voltage-applying socket, the power-applying module comprising:
  a substrate combined with the driving voltage-applying socket by a sliding method;
  a voltage transformer disposed on the substrate;
  a voltage-applying pattern formed at an end portion of the substrate and electrically connected to the driving voltage-applying socket to apply the driving voltage output by the voltage transformer to the driving voltage-applying socket;
  a voltage induction pattern formed on the substrate adjacent to the voltage-applying pattern and spaced apart from the voltage-applying pattern to sense an induced voltage corresponding to the driving voltage, the induced voltage being induced by the voltage-applying pattern; and
  a protection part detecting the induced voltage to control the driving voltage output by the voltage transformer,
 wherein the voltage-applying pattern and the voltage induction pattern are formed on the same surface of the substrate without being formed on an opposite surface of the substrate, wherein the voltage induction pattern is rectangular and having a rectangular width greater than a linear pattern of a signal line connected to the voltage induction pattern, wherein the voltage transformer is a multiple-output transformer configured to simultaneously output respective driving voltages to a plurality of lamps, and wherein the rectangular voltage induction pattern senses the induced voltage resulting solely from the voltage applying pattern on the same surface of the substrate.

13. The backlight assembly of claim 12, wherein the voltage transformer is formed on the same surface of the substrate as the voltage-applying patterns.

14. The backlight assembly of claim 12, wherein the protection pan stops the voltage transformer from outputting the driving voltage when the driving voltage is greater than a reference voltage having a predetermined voltage level.

15. The backlight assembly of claim 12, further comprising a receiving container including a bottom plate and sidewalls formed on edges of the bottom plate to receive the light source units and the driving voltage-applying socket.

16. The backlight assembly of claim 15. wherein a portion of the driving voltage-applying socket protrudes below the bottom plate through a socket hole formed through the bottom plate, and the portion of the driving voltage-applying socket has an insertion recess for combining with the substrate by the sliding method.

17. The backlight assembly of claim 15, further comprising at least one ground voltage-applying socket disposed in the receiving container and electrically connected to at least one electrode different from the electrode electrically connected to the driving voltage-applying socket so as to apply a ground voltage.

18. The backlight assembly of claim 17, wherein the ground voltage-applying socket is electrically connected to the receiving container to receive the ground voltage.

19. The backlight assembly of claim 18, further comprising a metal connection plate electrically connecting the ground voltage-applying socket to the receiving container.

20. A display apparatus comprising:
a display panel to display an image;
a backlight assembly including a plurality of light source units providing light to the display panel, at least one driving voltage-applying socket electrically connected to at least one of electrodes of the light source units to apply a driving voltage, and a power-applying module applying the driving voltage to the driving voltage-applying socket, the power-applying module comprising:
a substrate combined with the driving voltage-applying socket by a sliding method;
a voltage transformer disposed on the substrate;
a voltage-applying pattern formed at an end portion of the substrate and electrically connected to the driving voltage-applying socket to apply the driving voltage output by the voltage transformer to the driving voltage-applying socket;
a voltage induction pattern formed on the substrate adjacent to the voltage-applying pattern and spaced apart from the voltage-applying pattern to sense an induced voltage corresponding to the driving voltage, the induced voltage being induced by the voltage-applying pattern; and
a protection part detecting the induced voltage to control the driving voltage output by the voltage transformer, wherein the voltage-applying pattern and the voltage induction pattern are formed on the same surface of the substrate without being formed on an opposite surface of the substrate, wherein the voltage induction pattern is rectangular and having a rectangular width greater than a linear pattern of a signal line connected to the voltage induction pattern, wherein the voltage transformer is a multiple-output transformer configured to simultaneously output respective driving voltages to a plurality of lamps, and wherein the rectangular voltage induction pattern senses the induced voltage resulting solely from the voltage applying pattern on the same surface of the substrate.

* * * * *